United States Patent Office 3,133,399
Patented May 19, 1964

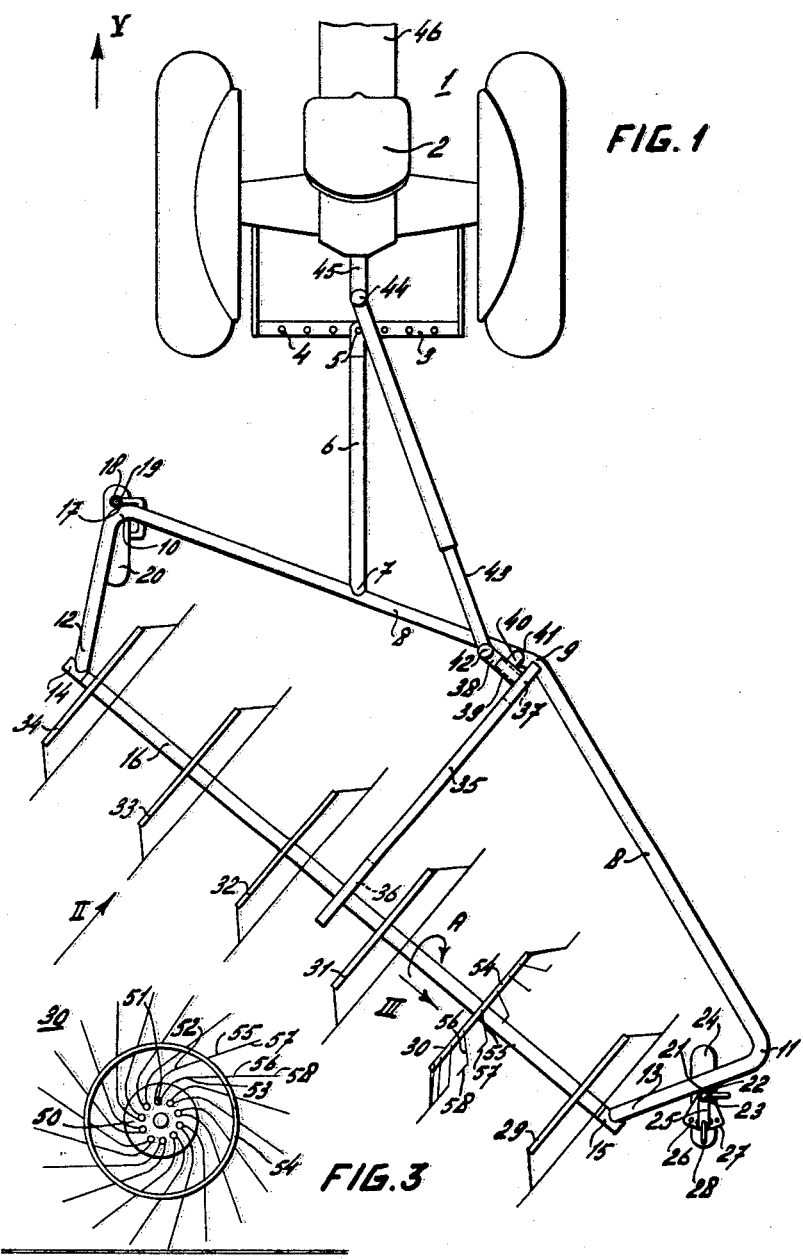

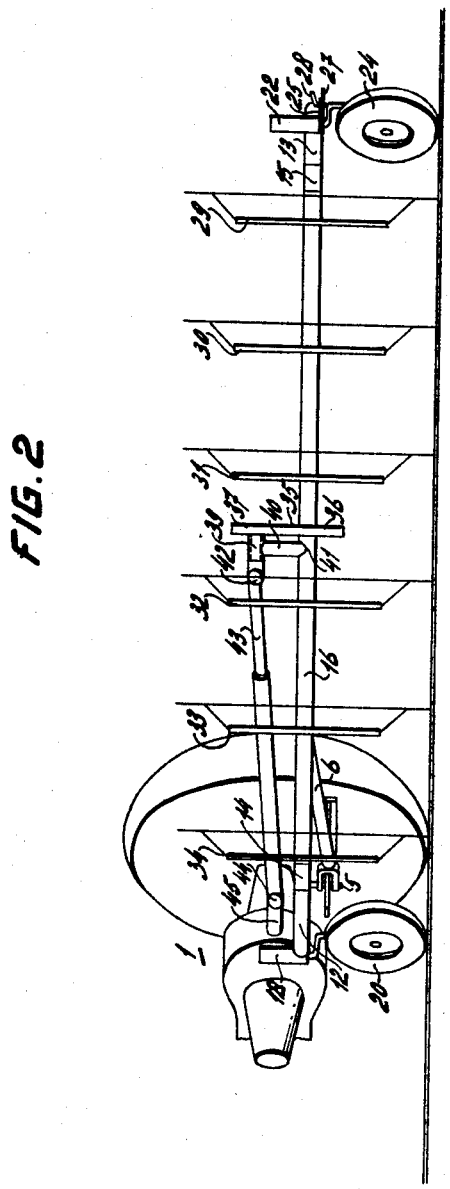

3,133,399
DEVICES FOR TEDDING CROP LYING
ON THE GROUND
Cornelis van der Lely, Zug, Switzerland, and Ary van der
Lely, Maasland, Netherlands, assignors to C. van der
Lely N.V., Maasland, Netherlands, a Dutch limited-
liability company
Continuation of application Ser. No. 72,530, Nov. 29,
1960, which is a continuation of application Ser. No.
603,672, Aug. 13, 1956. This application Aug. 29,
1962, Ser. No. 220,334
Claims priority, application Netherlands Aug. 13, 1955
17 Claims. (Cl. 56—372)

The invention relates to devices for tedding crop lying on the ground, and more particularly to devices of the type provided with an axle driven by a running wheel or a motor and supported rotatably in a frame, said axle making an acute angle with the traveling direction of the device. This application is a continuation of the applicants' prior application Serial No. 72,530 filed November 29, 1960, and now abandoned, which in turn was a continuation of applicants' further prior application Serial No. 603,672, filed August 13, 1956, also now abandoned.

In known devices of this kind, the axle is normally provided with tines extending in rows according to the position of the axle. Crop can be tedded intensively by such devices, it is true, but unfortunately the crop is thrown down haphazardly and thus a substantial part of the wet and heavier crop is undesirably covered after the tedding action.

An object of the present invention is to provide a device which does not have the above disadvantage, and to this end, according to the invention, spaced rake wheels are mounted on an axle. Said rake wheels work strips which are adjacent transversely of the device. The crop on each of these strips is displaced laterally for a small distance by one of the rake wheels and turned at the same time, while being in contact with a side plane of the rake wheel. The crop lying at the bottom is, as a result, positioned on top after the tedding treatment whereby the drying process is greatly hastened. At the same time, experiments have proved that, in contradistinction to known devices, apparatus of the invention is well adapted for being driven at great speeds.

As a feature of the invention, it is advantageous to make the angle between the axle and the traveling direction adjustable in order to be able to attain a most favorable working for all kinds of crop.

Further, it is particularly advantageous if the tines of each rake wheel are situated in a plane which is perpendicular to the axle carrying the associated rake wheel and if each is rotatable about a hinge axle, these hinge axles crossing the axles carrying the rake wheels and being situated in a common plane which is parallel to and at a distance from the plane which comprises the tines. Owing to this, the tines of the rake wheels can adapt themselves to irregularities of the ground, so that each rake wheel continues working whether it is located above an elevation or a depression. This result is achieved by the invention because narrow strips are worked independently of one another, viz., each rake wheel works one strip. Therefore, tines working adjacent strips cannot cause the taking along of material of an intermediate strip if the latter would require working in a less favorable position of the rake wheel with regard to the ground.

A further object of the present invention is to provide an improved device by which the crop can be worked in a particularly favorable way. As a feature of the invention to provide the raking means with resilient tines which comprise two relatively inclined portions and which can resiliently deviate about axis extending parallel to a plane perpendicular to the axis of rotation of the raking means. Owing to this, the tines of the rake wheels can adapt themselves to irregularities of the ground.

Further it is particularly advantageous to make the angle between the axis of rotation of the raking means and the travelling direction adjustable in order to be able to attain a most favorable working for all kinds of crop.

Further features and details of the invention will be hereinafter more fully described with reference to the accompanying drawing in which a preferred embodiment is illustrated by way of example and in which:

FIGURE 1 is an elevational view of said device coupled to a tractor,

FIGURE 2 is a side view of this device viewed in the direction of arrow II in FIG. 1.

FIGURE 3 is a side view of one of the rake wheels of the device according to FIGS. 1 and 2 viewed in axial direction.

According to FIGS. 1 and 2, a tractor is provided behind its driver's seat with a beam 3 in which some holes 4 are provided. A bolt 5 is inserted through one of said holes by means of which the fore-part of a coupling arm or drawing element 6 is movably connected to the tractor. The arm 6 is fixedly attached at 7 to a frame beam or tube 8 which is bent at 9, 10 and 11 and the extremities or frame beams 12 and 13 of which carry bearings 14 and 15 for the extremities of an axle or elongated rotatable shaft 16 at the same height as frame 8 and behind the latter. A vertical bushing 18 is connected to the tube 8 at 17, the vertical hinge axle 19 of a self-adjusting running wheel 20 being rotatably housed in said bushing 18. A vertical bushing 22 is attached at 21 to the tube 8, the vertical hinge axle 23 of an adjustable running wheel 24 being rotatably housed in said vertical bushing 22. The lower end of the bushing 22 carries a horizontal perforated lip 25, whereas the axle 23 below said lip carries a horizontal sector 27 which is provided with holes 26. A locking pin 28 can be inserted through the lip and the sector for fixing the plane of the wheel 24 with regard to the frame beam 8.

The axle 16 carries six coaxial rake wheels 29–34 which are fixedly mounted on said axle. The axle 16 is put into rotation by means of an endless member such as chain or belt 35 which drives a sprocket or driven wheel 36 centrally located on the axle 16 and is driven by a sprocket or driving wheel 37. The sprocket wheel 37 is mounted on the rear end of an axle or shaft 38 which is rotatably housed in a bearing 39. Said bearing is rigidly connected at 41 to the frame 8 by means of a short tube 40.

The forepart of the axle 38 is coupled to a telescopic axle 43 by means of a joint 42 preferably of known universal type. Said axle 43 itself is coupled to a power-take-off mechanism 45 by means of a conventional universal joint 44. In this way, the axle 16 can be driven in the direction of the arrow A by the tractor motor 46.

The rake wheels 29–34 have the same construction which is shown in greater detail for the rake wheel 30. According to FIG. 3, this rake wheel comprises a disc 50 which is fixedly mounted on the axle 16, and spoke members such as spokes 52 and 53 which are clamped on said disc by means of bolts 51. These spokes are inserted through a perforated rim 54 spaced from axle 16 and have portions outside of said rim bent away from the plane of said rim which constitute supporting members such as the supporting arms 55 and 56 for the tine members such as tines 57 and 58. Whereas the spokes lie in the plane of the rim 54, the tines lie in a plane parallel to and spaced from the plane of the rim 54. The spokes constitute pivots for the tines, each tine making an angle of less than 20° with its pivot. Further, each plane which is parallel to the axle 16 and which comprises a pivot for a tine, said pivot being constituted by a spoke, makes an angle of less than 20° with a plane comprising the associated pivot and the point of the associated tine. The pivots cross the axle 16 at right angles. The rake wheels 29–34 are equally spaced.

The operation of the device described is as follows:

If the tractor 1 is moved on in the direction V (FIG. 1) and if the power-take-off mechanism 45 is driven by the tractor motor 46, the tractor 1 draws the frame or tube 8 of the tedder in direction V, because the running wheel 24 supporting the tube 8 is secured. The running wheel 20 supports the tube 8 as well, so that the frame which is as well connected to the bolt 5 by means of the tube 6 is supported at three points, viz. near the wheels 20 and 24 and near the bolt 5. The axle 16 supported in the bearings 14 and 15 is driven by means of the power take-off in the direction A and moves the crop with the tines of the rake wheels 29–34 to the left and rearward.

The rake wheels 29–34 thus work separate narrow strips, during which treatment the crop lying upon said strips is not displaced only laterally, but is also turned over so that the wettest crop at the bottom lies over the entire worked field after the tedding action.

The tines need not be spread over the entire length of the axle 16, but need only be arranged on rims at a small number of places. This offers constructional advantages, because only a relatively small number of tines is necessary and the tines can be mounted on a small number of supports constituted by discs 50 of the rake wheel 30.

The fastening of the tines is such that they can deflect by turning about their axles. They never turn more than about 90° as a consequence of the chosen starting position of the arms carrying the tines.

The arrangement of the rake wheels permits the axle 16 to be accessible at many places, so that the drive need not be at the ends.

What is claimed is:

1. A tedding device comprising elongated rotatable means having an axis of rotation and a predetermined direction of rotation about said axis, driving means coupled to and positively driving said rotatable means, elastic tines circumferentially and axially spaced along said rotatable means and inclined opposite to said predetermined direction of rotation, the tines having opposite ends, means operatively associated with said rotatable means and fastening one of the ends of said tines thereto, and supporting means operatively positioned with respect to said tines and supporting the same at a location spaced from said rotatable means, said tines each including a first portion on the outside of said supporting means extending at an angle to a plane perpendicular to said axis of rotation and comprising the end of the tine fastened to said rotatable means and said tines each including a second portion extending outwardly from said first portion and at least substantially parallel to said plane.

2. A tedding device as claimed in claim 1, wherein the supporting means maintain the tines in spaced relation.

3. A tedding device comprising rotatable means having an axis of rotation and a predetermined direction of rotation about said axis, driving means coupled to and positively driving said rotatable means elastic tines circumferentially spaced along said rotatable means and inclined opposite to said predetermined direction of rotation, means operatively associated with said rotatable means and fastening one of the ends of said tines thereto, said means defining an axis about which the tines can resiliently deviate, said axis extending substantially parallel to a plane perpendicular to said axis of rotation, said tines including a first portion extending at an angle to a plane perpendicular to said axis of rotation and comprising the end of the tine fastened to said rotatable means and said tines each including a second portion extending outwardly from said first portion and at an angle to said first portion.

4. A tedding device comprising a frame and elongated rotatable means supported in said frame, said rotatable means having an axis of rotation and a predetermined direction of rotation about said axis, driving means coupled to and positively driving said rotatable means, tines circumferentially and axially spaced along said rotatable means and inclined opposite to said predetermined direction of rotation, ground wheels operatively associated with said frame for supporting the same, at least one of said ground wheels being adjustable about a vertical axis, and locking means for locking said adjustable ground wheel in different positions with respect to said frame.

5. A tedding device as claimed in claim 4 wherein said frame comprises a first frame beam situated in front of said rotatable means and substantially parallel to said axis of rotation, and two further frame beams attached to the ends of said first frame beam and extending to the rear thereof, the rotatable means being supported by the free ends of said further frame beams, said frame beams being situated at substantially the same level as said axis of rotation.

6. A tedding device as claimed in claim 5 comprising a ground wheel attached to one of said further frame beams.

7. A tedding device as claimed in claim 5 comprising a ground wheel attached to the frame near the junction of said first frame beam and one of said further frame beams.

8. A tedding device as claimed in claim 5 comprising a drawbar coupled to said first frame beam at a position spaced from the middle thereof.

9. An implement having a determinable direction of travel and comprising a mobile frame, an axle on said frame and disposed oblique to said direction of travel, and a plurality of parallel and axially spaced rake wheels on said axle, said rake wheels being in coaxial relation and being operatively associated in tedding arrangement.

10. An implement as claimed in claim 9 comprising a driving wheel on said frame, a driven wheel on said axle, an endless member coupling said driving and driven wheels, a tractor including a source of power, and means coupling said source to said driving wheel.

11. An implement as claimed in claim 9 wherein said axle is a straight rod.

12. An implement as claimed in claim 9 wherein said rake wheels are perpendicular to said axle.

13. A tedding device comprising elongated rotatable means having an axis of rotation and a predetermined direction of rotation about said axis, driving means coupled to and positively driving said rotatable means, a frame operatively associated with and supporting said rotatable means, tines circumferentially and axially spaced along said rotatable means and inclined opposite to said predetermined direction of rotation, means operatively associated with said rotatable means and fastening the tines thereto, and means operatively associated with said tines and spaced from said rotatable means for maintaining said tines in circumferentially spaced relation, wherein said rotatable means includes a rotatable shaft, comprising wheels axially spaced along said shaft and supporting said tines.

14. A device as claimed in claim 13 wherein said shaft and frame are substantially at the same height with respect to the ground traversed.

15. A device as claimed in claim 14 wherein the frame is in front of said shaft.

16. A device as claimed in claim 15 wherein the frame is coupled to the ends of the shaft.

17. A device as claimed in claim 16 comprising means located centrally of the shaft and engaging the driving means in driving relation.

References Cited in the file of this patent

FOREIGN PATENTS 532,469     Belgium _____ Oct. 30, 1954